(12) United States Patent
Ponzio et al.

(10) Patent No.: US 12,424,885 B2
(45) Date of Patent: Sep. 23, 2025

(54) STATOR, ELECTRIC MACHINE, APPARATUS AND METHOD FOR PREPARING A STATOR

(71) Applicant: ATOP S.p.A., Barberino Tavarnelle (IT)

(72) Inventors: Massimo Ponzio, Siena (IT); Rubino Corbinelli, Staggia Senese (IT); Daniele Nocciolini, Florence (IT)

(73) Assignee: ATOP S.p.A., Barberino Tavarnelle (IT)

( * ) Notice: Subject to any disclaimer, the term of this patent is extended or adjusted under 35 U.S.C. 154(b) by 382 days.

(21) Appl. No.: 18/015,642

(22) PCT Filed: Aug. 9, 2021

(86) PCT No.: PCT/EP2021/072151
§ 371 (c)(1),
(2) Date: Jan. 11, 2023

(87) PCT Pub. No.: WO2022/037984
PCT Pub. Date: Feb. 24, 2022

(65) Prior Publication Data
US 2023/0253839 A1 Aug. 10, 2023

(30) Foreign Application Priority Data
Aug. 20, 2020 (EP) .................................... 20191846

(51) Int. Cl.
*H02K 1/16* (2006.01)
*H02K 3/12* (2006.01)
(Continued)

(52) U.S. Cl.
CPC ............... *H02K 1/165* (2013.01); *H02K 3/12* (2013.01); *H02K 3/345* (2013.01); *H02K 3/38* (2013.01);
(Continued)

(58) Field of Classification Search
CPC .. H02K 3/24; H02K 1/20; H02K 9/00; H02K 1/16
See application file for complete search history.

(56) References Cited

U.S. PATENT DOCUMENTS

| 5,845,389 A | 12/1998 | Roberts et al. |
| 11,545,866 B2 * | 1/2023 | Leonardi ................. H02K 3/28 |

(Continued)

FOREIGN PATENT DOCUMENTS

| GB | 147778 | 11/1921 |
| GB | 2574409 | 12/2019 |

(Continued)

*Primary Examiner* — Leda T Pham
(74) *Attorney, Agent, or Firm* — Haley Guiliano LLP; Jeffrey H. Ingerman (57) ABSTRACT

The invention relates to a stator (100) which may be used within an electric rotating machine, an electric machine, an apparatus for preparing a stator and a method for preparing a stator. The stator (100) comprises a stator core (10) having a plurality of slots (11) arranged in a circumferential direction (C) of the stator core (10). At least a first conductor (12) and at least a second conductor (13) are arranged along a radial direction (R) of one slot (11). Axial end sections (22, 23) of the conductors (12, 13) are electrically connectable or connected and the axial end sections (22, 23) of radially adjacent conductors (12, 13) are distanced from each other. The distance (28) between the proximal end (29) of the axial end section (22) of a first conductor (12) and the stator core (10) is longer than the distance (26) between the distal end (27) of the axial end section (23) of a second conductor (13) and the stator core (10).

22 Claims, 5 Drawing Sheets

(51) Int. Cl.
  *H02K 3/34* (2006.01)
  *H02K 3/38* (2006.01)
  *H02K 3/50* (2006.01)
  *H02K 15/062* (2025.01)
  *H02K 15/064* (2025.01)
  *H02K 15/085* (2006.01)

(52) U.S. Cl.
  CPC ............. *H02K 3/50* (2013.01); *H02K 15/063* (2013.01); *H02K 15/064* (2013.01); *H02K 15/085* (2013.01); *H02K 2213/03* (2013.01)

(56) References Cited

U.S. PATENT DOCUMENTS

| | | | |
|---|---|---|---|
| 2013/0020891 A1* | 1/2013 | Kishi | H02K 15/0414 |
| | | | 29/605 |
| 2013/0200743 A1 | 8/2013 | Okimitsu | |
| 2014/0319960 A1* | 10/2014 | Iki | H02K 3/12 |
| | | | 310/216.115 |
| 2015/0280503 A1* | 10/2015 | Takahashi | H02K 3/12 |
| | | | 310/201 |

FOREIGN PATENT DOCUMENTS

| | | |
|---|---|---|
| JP | 5848156 | 1/2016 |
| WO | WO2019/084587 | 5/2019 |

\* cited by examiner

STATOR, ELECTRIC MACHINE, APPARATUS AND METHOD FOR PREPARING A STATOR

The invention relates to a stator which may be used within an electric rotating machine, an electric machine, an apparatus for preparing a stator and a method for preparing a stator.

Usually a plurality of slots is formed in a stator core which extend in an axial direction of the stator. The stator comprises a stator winding made of conductors having an in-slot portion being disposed in the slots.

In stator assemblies insulating sheets are used for lining the walls of the slots of the stator core. In case of stator assemblies where more than one conductor is inserted into one slot, insulating sheets can also be used for providing insulation between neighbouring conductors.

A stator winding may be made by means of conductors comprising rigid bars which are axially inserted into the stator slots.

The conductors may be "U"-shaped and form an entry side, on which the base of the "U"-shaped conductors is arranged, and an exit side, on which the legs of the "U"-shaped conductors are arranged.

Alternatively the conductors may have free ends on both sides of the stator core. In any case, the free ends of at least some of the conductors have to be connected to a free end of another conductor by means of welding to form electrical paths of the stator winding. A connection can be formed by twisting and welding the free ends of the conductors and/or by providing a separate connection element.

On the one hand the free ends of the conductors have to be connectable and on the other hand care must be taken to ensure that adjacent conductors do not touch each other and short circuit the designed winding arrangement.

It is therefore an object of the present invention to overcome the drawbacks of the prior art and in particular to provide a stator, an apparatus and a method which allow to form a desired winding arrangement with high accuracy in a simple and reliable way.

According to the invention these another objects are solved with a stator, an apparatus for preparing a stator and a method of forming a stator according to the independent claims.

According to the invention a stator for a rotating electric machine comprises a stator core which has a plurality of slots arranged in a circumferential direction of the stator core.

The slots are formed in the stator core.

Within this application the terms axial, circumferential and radial refer to the geometry of the stator.

The stator core comprises a longitudinal axis of symmetry and the stator core comprises two opposite axial surfaces, substantially perpendicular to the axis of symmetry. The slots are arranged circumferentially around the longitudinal axis of symmetry.

At least a first conductor and at least a second conductor are arranged next to each other along a radial direction in one slot of the stator core. Preferably, in each slot of the stator core at least a first conductor and at least a second conductor are arranged.

The conductors comprise protruding portions which protrude from the slots on at least one axial side of the slot.

The protruding portion of at least one of the conductors may have an axial base section closer to the axial surface of the stator core and an axial end section, farther from the same axial end surface. The axial base section may at least partially be covered by an insulation member.

The insulation member preferably is arranged between two radially adjacent conductors to prevent a contact between the axial base section of a first conductor and an axial end section of second radially adjacent conductor.

Axial end sections of the conductors are electrically connectable or connected, at least on one axial side of the stator core, for example to a conductor arranged in a different slot. The axial end sections are those sections which are free from a separate insulating member.

Conductors and thereby the axial end sections may comprise an insulating coating, which breaks up when an electrical contact is established.

The axial end sections are axially delimited by a proximal end directed towards the stator core and a distal end directed away from the stator core. Each axial end section extends between the proximal end, which is closer to the axial surface of the stator core, and the distal end which is farthest from the same axial surface of the stator core.

The axial end sections of the conductors protrude from the axial surface of the stator core.

For being electrically connectable the outer surface of the axial end section of the conductor is at least partially free from an insulating member made of an insulating material along an uninsulated axial length.

Besides the axial end sections a further part of the conductor, namely the axial base section, may axially protrude from the slots which is not electrically connectable or connected. The radially inner surface, the radially outer surface as well as the lateral outer surfaces of this part may be fully enclosed by an insulating member.

The insulating member may be insertable into a slot of the stator core template independently from the conductors.

Insulating members may be formed from sheets which are offered under the name NOMEX of MYLAR. The thickness of the sheet may be 0.1 mm to 0.5 mm, preferably 0.18 mm to 0.3 mm.

The outer surface of the conductors along the in-slot portion is separated from the walls of the slot and from adjacent conductors by at least one insulating member to prevent a contact to the walls of the slot and to the adjacent conductor. Thus, the insulating member prevents a short circuit between conductors arranged adjacently in one slot and/or between a conductor and the inner wall of a slot.

After an electrical connection has been established between the axial end sections, the connected end sections may be covered by an insulating member.

According to the invention, the axial end sections of radially adjacent conductors are distanced from each other.

The axial end sections of radially adjacent conductors may be distanced from each other by being axially distanced from each other.

This means that due to the distance there are no uninsulated sections directly adjacent to each other which could create an unintended contact.

The distance between the proximal end of the axial end section of a first conductor and an axial surface of the stator core is longer than the distance between the distal end of the axial end section of a second radially adjacent conductor and the axial surface of the stator core.

The axial end sections of two adjacent conductors may be axially distanced on both axial sides of the stator core. One conductor may be shorter than the other conductor, such that the longer conductor protrudes more from the stator core on both axial sides. Alternatively, one conductor may protrude more than the other conductor on a first axial side of the stator core, whereas the other conductor protrudes more than the first conductor from the second axial side of the stator core. The conductors may have the same axial length.

Additionally or alternatively the axial end sections of radially adjacent conductors may be distanced from each other by the conductors being radially distanced from each other by a distancing member in the slot, preferably by a distance of at least 1-2 mm.

Preferably, at least one insulating member made of an insulating material is disposed between radially adjacent conductor elements at least along the axial length of the slot.

At least on one axial side of the stator core the first conductor may protrude from the stator core by a first distance and the second radially adjacent conductor element may protrude by a second distance. The first distance may be larger than the second distance by a third distance.

The third distance may be from 7-14 mm, in particular 8-11 mm.

The axial end section of the first conductor may have an axial length of up to 5-10 mm, in particular 6-7 mm, which provides enough space for establishing an electrical connection.

An insulating member between the first conductor and the second conductor protrudes by a distance from the axial surface of the stator core which is at least as large as the second distance.

Thus, the uninsulated axial end section of the second conductor cannot contact the uninsulated axial end section of the first conductor.

Advantageously each conductor is wrapped around an axial axis by an insulating member, preferably by an individual insulating member.

The individual insulating member may have an overlapping section along the length of the slot to provide a safe insulation.

According to an advantageous embodiment of the stator the distancing member in the slot is formed by at least one radial spacer.

The radial spacer may in particular be formed by a separation wall and/or by separating abutments, which are disposed between at least the first conductor and the radially adjacent second conductor. The separation wall and/or the separating abutments may be arranged along the complete axial length a respective slot or only along a part or along a plurality of parts of the axial length.

The radial spacer may be a structural part of the stator core.

The stator core may be formed by laminations and the separation wall and/or the separating abutments may be arranged on all layers or only on some of the layers of the lamination.

The radial spacer may be formed by two opposing projections, having a basically rectangular or basically triangular shape in a plane perpendicular to the stator axis.

Hence, the slot is divided into radially distanced compartments, wherein each compartment only receives one conductor.

In a preferred embodiment of the stator, the conductors are formed by a plurality of axially extending conductor parts, for example by strands of conducting wires.

According to another aspect of the invention an electric machine comprising a stator as described above is provided.

According to a further aspect of the invention an apparatus for preparing a stator, preferably as described above, is provided.

The apparatus comprises a first insertion station for inserting at least two conductors into a slot of a stator core. Axial end sections of the conductors are uninsulated and are electrically connectable.

The apparatus further comprises a control unit for controlling the insertion of the conductors such that the axial end sections are axially distanced from each other. The distance between a proximal end of the axial end section of a first conductor and an axial surface of the stator core is longer than the distance between a distal end of the axial end section of a second radially adjacent conductor and the axial surface of the stator core.

The control unit may stop inserting a conductor as soon as a predetermined distance is achieved.

Additionally or alternatively the insertion station and the control unit may provide for inserting the conductors such that the conductors are radially distanced from each other by a distancing member in the slot, preferably by a distance of at least 1-2 mm. The conductors may be inserted into respective compartments in the slot.

The control unit may set a respective radial distance while inserting the conductors.

The control unit may comprise a processor, an input and/or an output. The processor may store a computer program. The input may be connected to a sensor providing data concerning the distance of the axial end sections of radially adjacent conductors.

The apparatus may comprise a second insertion station for inserting insulating members into the slots of the stator core. The second inserting station allow insertion of pre-shaped insulating members and the control unit may control the insertion such that a first pre-shaped insulating member axially protrudes by a larger distance from the axial surface of the stator core than a second pre-shaped insulating member adjacent to the first pre-shaped insulating member in the same slot. The control unit may stop inserting the insulating member as soon as a predetermined distance is achieved.

The first and the second inserting stations may be arranged such that the insulating members are inserted into a slot of the stator core before the conductors are inserted into the same slot. Preferably all insulating members for the stator are inserted before the conductors are inserted.

The apparatus may comprise a feed station for insulating members and/or the apparatus may comprise a feed station for conductors.

Preferably at least one feed station comprises a cutter, in particular for cutting insulating members from a sheet of insulating material or for cutting conductors, an embossing station, in particular for providing embossings in insulating members, a bending station, in particular for bending insulating sheets, and/or a supply unit. In particular the supply unit may either supply cut sheets to the bending station or supply a continuous strip to the bending station, where the sheets will be cut prior to the bending or after bending.

The apparatus may further comprise a connecting station for electrically connecting ends of the conductors, in particular by laser welding.

According to a further aspect of the invention a method for preparing a stator, preferably as described above, is provided.

At least two conductors are inserted into a slot of a stator such that the axial end sections of the conductors are electrically connectable. Each axial end section extends between a proximal end, which is closer to the axial surface of the stator core, and a distal end, which is farthest from the same axial surface of the stator core. The uninsulated axial end sections of radially adjacent conductors are distanced from each other.

The axial end section may be part of a protruding portion of the conductors protruding from the slot. The protruding portion may comprise an axial base section closer to the axial surface of the stator core than the axial end section. The axial base section is at least partially covered with an insulating member. The conductors may be inserted into the slot such that the axial end sections are axially distanced from each other. The distance between a proximal end of the axial end section and an axial surface of the stator core of a first conductor is longer than the distance between a distal end of the axial end section of a second conductor and the axial surface of the stator core.

Additionally or alternatively the conductors may be inserted into the slot such that the conductors are radially distanced from each other by a distancing member in the slot, preferably by a distance of at least 1-2 mm.

The method may comprise the step of inserting insulating members into the slots of the stator core.

Preferably the insulating members are inserted such that a first pre-shaped insulating member axially protrudes from the stator core by a larger distance than a second pre-shaped insulating member adjacent to the first pre-shaped insulating member in the same slot.

The method may comprise the step of forming an electrical connection between axial end sections of the conductors.

Figure 1:
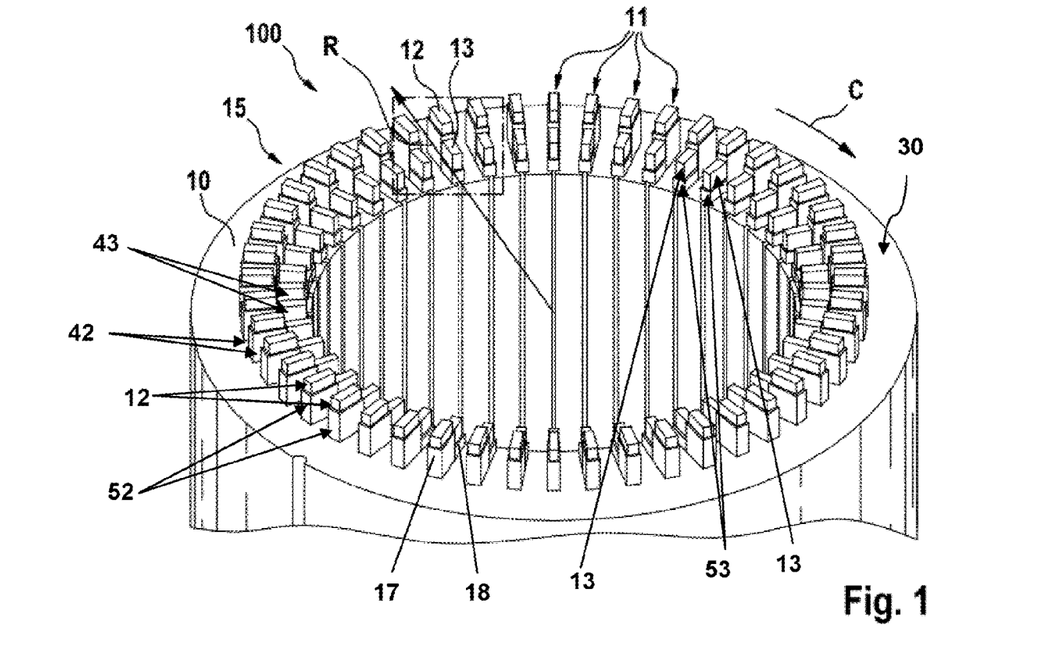
FIG. 1 a first embodiment of a stator according to the invention in a perspective view.

The invention will now be described with reference to preferred embodiments and the drawings, which show:

FIG. 1 shows a first embodiment of a stator 100 according to the invention in a perspective view.

The stator 100 comprises a stator core 10 which has a plurality of slots 11 arranged in a circumferential direction C of the stator core 10.

In each of the slots 11 a first conductor 12 and a second conductor 13 are arranged along a radial direction R of the respective slot 11.

The conductors 12, 13 protrude from the slots 11 on the shown axial side 15 of the stator core 10.

The conductors 12, 13 comprise protruding portions 42, 43 which protrude from the slots 11.

The protruding portions 42, 43 of the conductors 12, 13 have axial base sections 52, 53 closer to the axial surface 30 of the stator core 10 and axial end sections 22, 23, farther from the same axial end surface 30. The axial base sections 52, 53 are covered by insulation members 17, 18.

Figure 2:
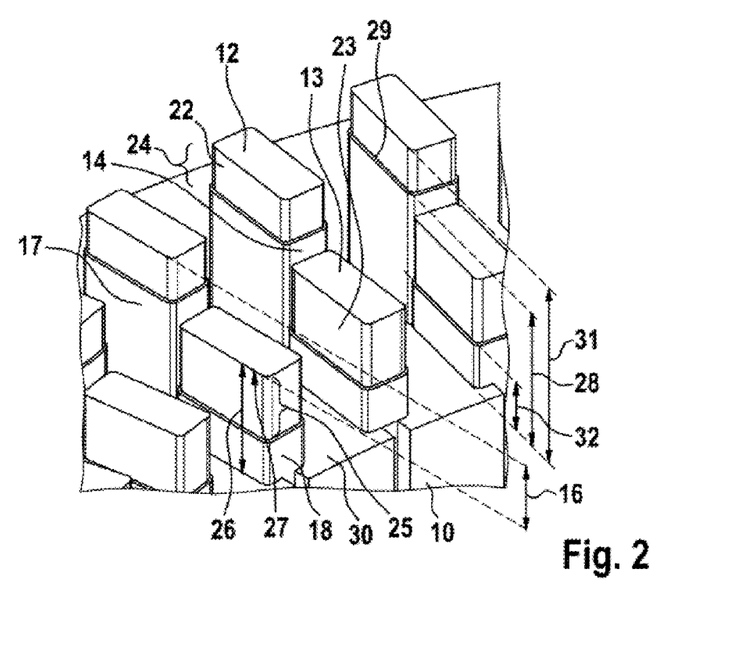
FIG. 2 a detail of the stator according to FIG. 1.

FIG. 2 shows a detail of the stator 100 according to FIG. 1.

Between radially adjacent conductors there is an insulating member 14. In this embodiment the conductors 12, 13 are individually wrapped by pre-shaped insulating members 17, 18.

Axial end sections 22, 23 of the conductors 12, 13 protruding from an axial surface 30 of the stator core 10 on one axial side 15 (see FIG. 1) of the stator core 10 are electrically connectable. The axial end sections 22, 23 of the conductors 12, 13 are free from the insulating member 14, 17, 18 along a respective axial length 24, 25.

The first conductor 12 of a slot 11 protrudes from the stator core 10 by a first distance 31. The second conductor 13 in the same slot 11 protrudes from the stator core 10 by a second distance 26. The first distance 31 is larger than the second distance 26.

The insulating member 14 between the first conductor 12 and the second conductor 13 protrudes from the stator core 10 by a third distance 28, which is also longer than the second distance 26.

Thus, in this embodiment the axial end sections 22, 23 of radially adjacent conductors 12, 13 are axially distanced from each other.

The second distance 26 between the distal end 27 of the axial end section 23 of the second conductor 13 and the axial surface 30 of the stator core 10 is smaller than the distance 28 between the proximal end 29 of the axial end section 22 of the first conductor 12 and the axial surface 30 of the stator core 10, and is equal to the third distance 28.

Each conductor 12, 13 is wrapped by an individual insulating member 17, 18.

The first pre-shaped insulating member 17 wrapped around the first conductor 12 axially protrudes from the stator core 10 by a distance 28 which is larger than the distance 32 by which the second pre-shaped insulating member 18 wrapped around the second conductor 13 protrudes from the stator core 10.

Figure 3:
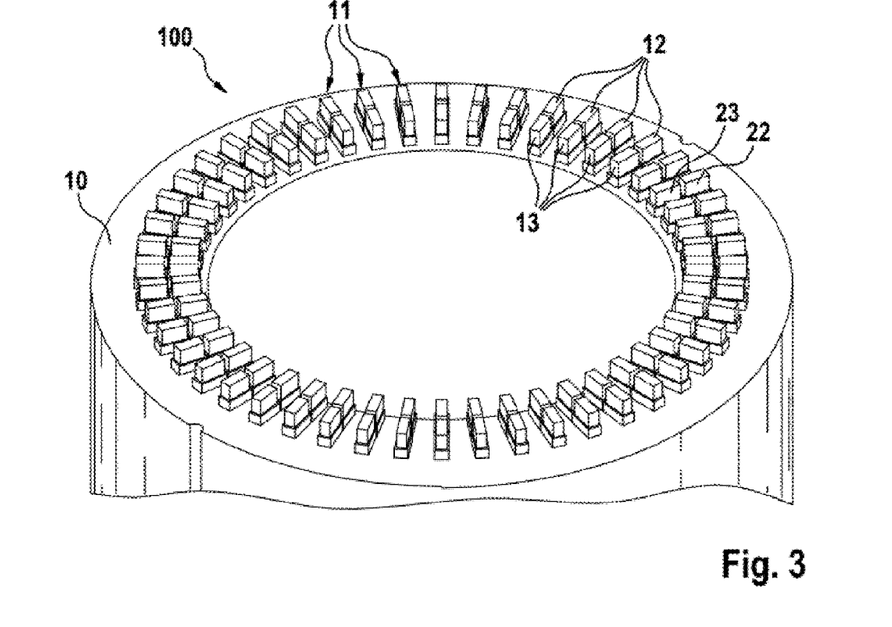
FIG. 3 a second embodiment of a stator according to the invention in a perspective view.

FIG. 3 shows a second embodiment of a stator 100 according to the invention in a perspective view.

All conductors 12, 13 have the same axial length, but however, the axial end sections 22, 23 of radially adjacent conductors 12, 13 in one slot 11 are radially distanced from each other.

Figure 4:
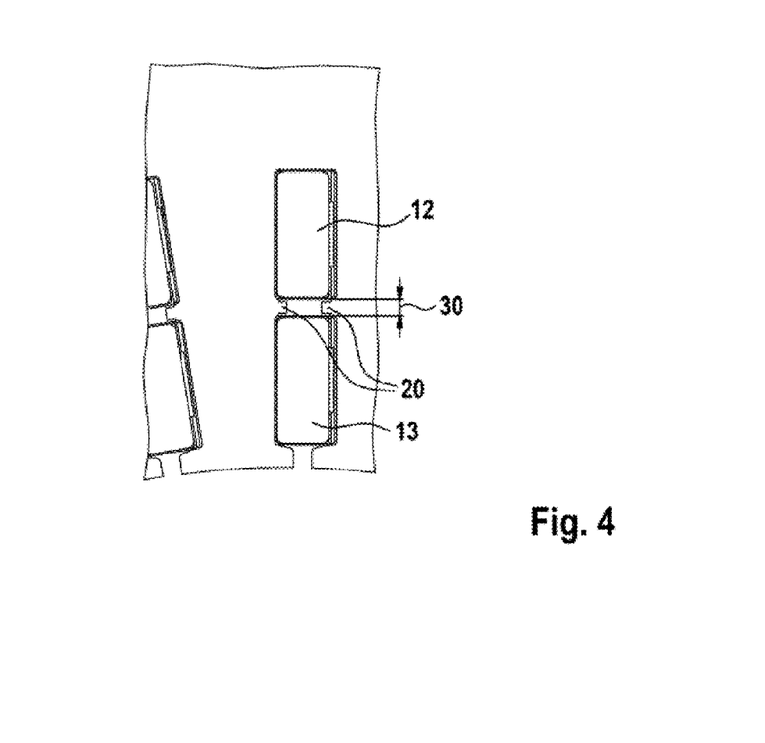
FIG. 4 a detail of the stator of FIG. 3 in top view.

FIG. 4 shows a detail of the stator of FIG. 3 in top view.

The conductors 12, 13 are radially distanced from each other by a distancing member in the slot 11, formed by two opposing projections 20, having a basically rectangular shape. The conductors 12, 13 are separated by a radial distance 30.

Figure 5:
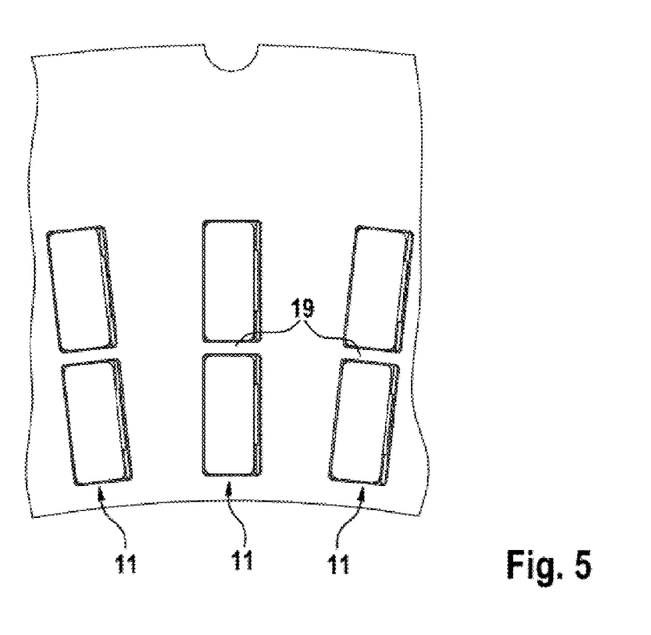
FIG. 5 a detail of an alternative embodiment of the stator core in top view.

As can be seen in FIG. 5 the distancing member may also be formed by a separation wall 19.

Figure 6:
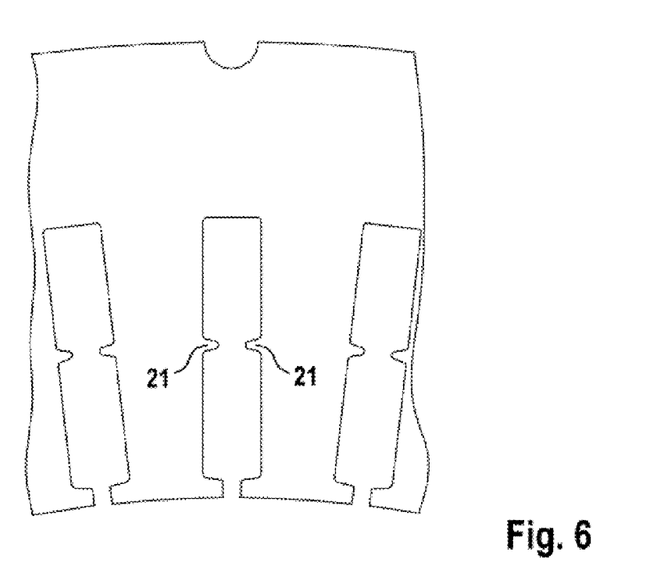
FIG. 6 a detail of a further alternative embodiment of the stator core in top view.

A further alternative is shown in FIG. 6. The distancing member may also be formed by projections 21 having a basically triangular shape as seen in top view.

Figure 7:
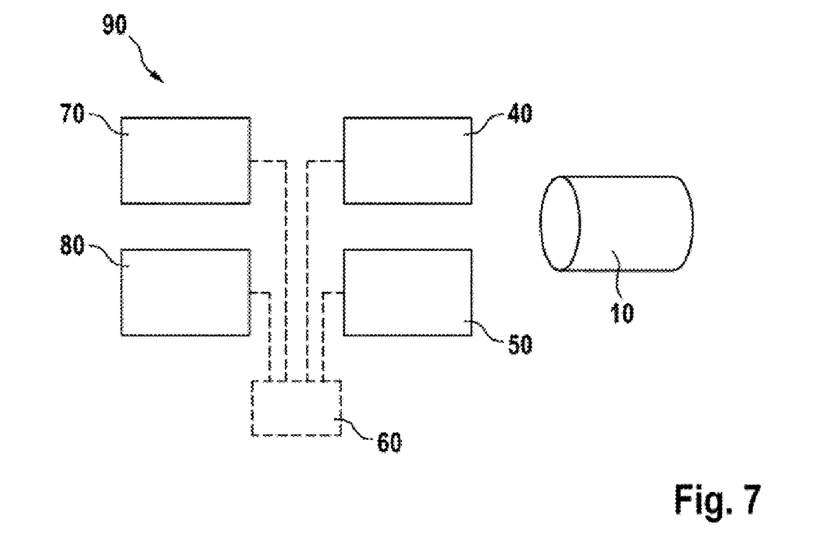
FIG. 7 a schematic representation of an apparatus according to the invention.

FIG. 7 shows a schematic representation of an apparatus 90 according to the invention.

The apparatus 90 comprises a first insertion station 40 for inserting at least two conductors into a slot of a stator core 10 and a second insertion station 50 for inserting insulating members into the slots of the stator core 10.

The apparatus 90 also comprises a feed station 70 for supplying conductor elements and a feed station 80 for supplying pre-shaped insulating members.

The apparatus 90 further comprises a control unit 60, which controls the first insertion station 40, the second insertion station 50, the feed station 70 for supplying conductor elements and the feed station 80 for supplying pre-shaped insulating members.

Figure 8:
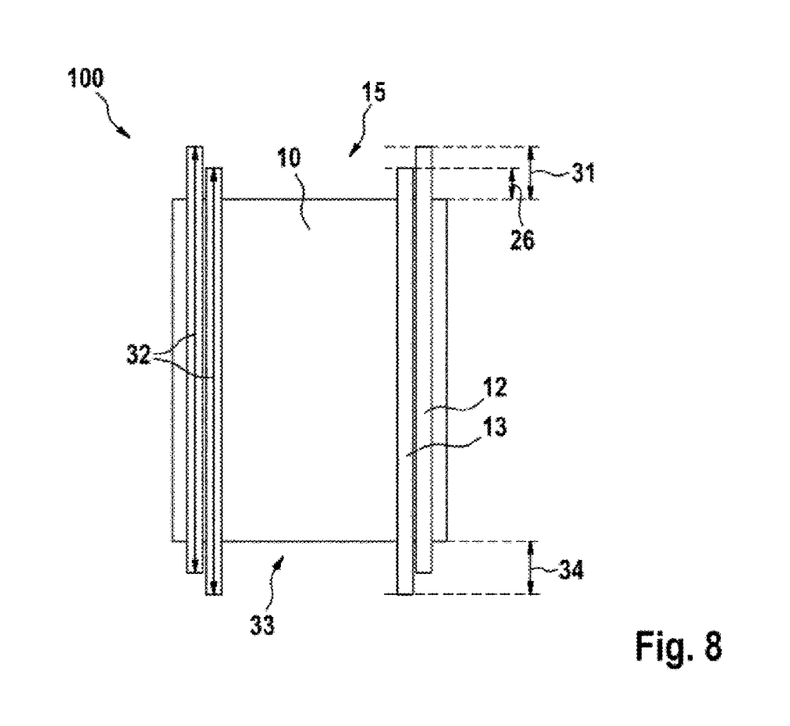
FIG. 8 the stator according to FIG. 1 in a sectional view in an axial plane.

FIG. 8 shows the stator 100 according to FIG. 1 in a sectional view in an axial plane.

On a first side 15 of the stator core 10 the first conductor 12 protrudes from the stator core 10 by a first distance 31. The second conductor 13 protrudes from the stator core 10 by a second distance 26. The first distance 31 is larger than the second distance 26.

As both conductors 12, 13 have the same axial length 32, on the second axial side 33 of the stator 10 the second conductor 13 protrudes from the stator core 10 by a longer distance 34 than the first conductor 12.

Figure 9:
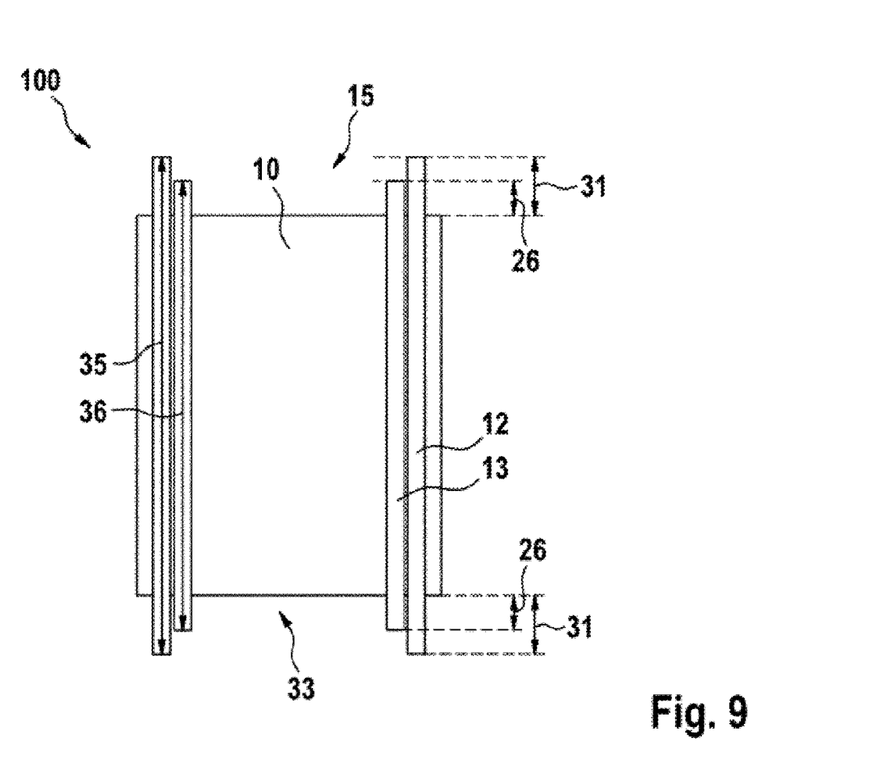
FIG. 9 an alternative embodiment of a stator according to FIG. 1 in a sectional view in an axial plane.

FIG. 9 shows an alternative embodiment of the stator 100 according to FIG. 1 in a sectional view in an axial plane.

As the axial length 35 of the first conductor 12 is longer than the axial length 36 of the second conductor 13, the distance 31 by which the first conductor 12 protrudes form the stator core 10 is larger than the distance 26 by which the second conductor 13 protrudes from the stator core 10 on both axial sides 15, 33 of the stator core 10.

The invention claimed is:

1. A stator for a rotating electric machine, the stator comprising:
 a stator core which has a plurality of slots arranged in a circumferential direction of the stator core; and
 at least a first conductor and at least a second conductor arranged next to each other along a radial direction of one slot of the plurality of slots, wherein:
 axial end sections of the first and second conductors are free from a separate insulating member,
 the axial end sections are axially delimited by a proximal end directed towards the stator core and by a distal end directed away from the stator core, and
 the axial end sections of the radially adjacent first and second conductors are distanced from each other, characterized by:
 the axial end sections being axially distanced from each other, wherein an axial distance between a proximal end of the axial end section of a first conductor and an axial surface of the stator core is longer than the distance between a distal end of the axial end section of the second conductor and the axial surface of the stator core, and
 each respective slot of the plurality of slots providing respective compartments formed by respective distancing members such that the first and second conductors are radially distanced from each other by the respective distancing members in respective slots.

2. The stator according to claim 1, wherein the first and second conductors are radially distanced from each other by a distancing member in the one slot by a distance of at least 1-2 mm.

3. The stator according to claim 1, wherein at least one insulating member made of an insulating material is disposed between the first conductor and the second radially adjacent conductor.

4. The stator according to claim 1, wherein at least on one axial side of the stator core the first conductor protrudes from the stator core by a first distance and a second radially adjacent conductor element protrudes by a second distance, wherein the first distance is larger than the second distance by a third distance.

5. The stator according to claim 4, wherein the third distance is between 5 mm and 10 mm.

6. The stator according to claim 4, wherein at least one insulating member disposed between the first conductor and the second conductor protrudes by a distance from the stator core which is at least as large as the second distance.

7. The stator according to claim 1, wherein each conductor is wrapped by an insulating member.

8. The stator according to claim 7, wherein each conductor is wrapped by an individual pre-shaped insulator.

9. The stator according to claim 1, wherein each of the respective distancing members is formed by at least one respective radial spacer disposed between at least a first element of the first conductor and a second element of the radially adjacent second conductor.

10. The stator according to claim 9, wherein each respective distancing member is formed by a separation wall or separating abutments.

11. The stator according to claim 9, wherein the radial spacer is formed by two opposing projections, having a substantially rectangular or substantially triangular shape in a plane perpendicular to an axis of the stator.

12. The stator according to claim 1, wherein the conductors are formed by strands of conducting wires.

13. An electric machine comprising:
 a stator for rotating the electric machine, the stator comprising:
 a stator core which has a plurality of slots arranged in a circumferential direction of the stator core; and
 at least a first conductor and at least a second conductor arranged next to each other along a radial direction of one slot of the plurality of slots, wherein:
 axial end sections of the conductors are free from a separate insulating member,
 the axial end sections are axially delimited by a proximal end directed towards the stator core and by a distal end directed away from the stator core, and
 the axial end sections of radially adjacent first and second conductors are distanced from each other, characterized by:
 the axial end sections being axially distanced from each other, wherein an axial distance between a proximal end of the axial end section of a first conductor and an axial surface of the stator core is longer than the distance between a distal end of the axial end section of the second conductor and the axial surface of the stator core, and
 each respective slot of the plurality of slots providing respective compartments is formed by respective distancing members such that the first and second conductors are radially distanced from each other by the respective distancing members in respective slots.

14. An apparatus for preparing a stator, the apparatus comprising:
 a first insertion station for inserting at least two conductors into a slot of a plurality of slots of the stator, such that respective axial end sections of the two conductors are electrically connectable; and
 a control unit for controlling the insertion of the conductors into the slot such that the respective axial end sections of the two radially adjacent conductors are distanced from each other, characterized by:
 the respective axial end sections being axially distanced from each other, and axial distance between a proximal end of a respective axial end section of a first conductor of the two conductors and an axial surface of a stator core of the stator is longer than the distance between a distal end of a respective axial end section of a second conductor of the two conductors and the axial surface of the stator core, and the plurality of slots providing respective compartments that are formed by respective distancing members such that the two conductors being are radially distanced from each other by the respective distancing members in respective slots.

15. The apparatus as claimed in claim 14, wherein the apparatus is an apparatus for preparing a stator, the stator comprising:
the stator core which has the plurality of slots arranged in a circumferential direction of the stator core; and
at least a first conductor of the two conductors and at least a second conductor of the two conductors arranged next to each other along a radial direction of the slot of the plurality of slots, wherein:
axial end sections of the two conductors are free from a separate insulating member,
the axial end sections are axially delimited by a proximal end directed towards the stator core and by a distal end directed away from the stator core, and
the axial end sections of the two radially adjacent conductors are distanced from each other, characterized by:
the axial end sections being axially distanced from each other, wherein an axial distance between a proximal end of the axial end section of the first conductor and an axial surface of the stator core is longer than a distance between a distal end of the axial end section of the second conductor and the axial surface of the stator core, and
the plurality of slots providing respective compartments formed by respective distancing members, such that the two conductors are radially distanced from each other by the respective distancing members in respective slots.

16. The apparatus as claimed in claim 14, wherein the two conductors are radially distanced from each other by a respective distancing member in the slot by a distance of at least 1-2 mm.

17. The apparatus as claimed in claim 14, wherein the apparatus comprises an second insertion station for inserting insulating members into the slots of the stator core, and wherein the control unit is adopted to insert the insulating members such that a first pre-shaped insulating member axially protrudes by a distance from the stator core which is larger than a distance by which a second pre-shaped insulating member protrudes from the stator core, the second pre-shaped insulating member being radially adjacent to the first pre-shaped insulating member in a same slot of the plurality of slots.

18. The apparatus as claimed in claim 14, wherein the apparatus comprises at least one feed station, at least one of the at least one feed station comprising at least one of: (a) a cutter, (b) an embossing station, (c) a bending station, or (d) a supply unit.

19. A method for preparing a stator, the method comprising:
inserting at least two conductors into a slot of a plurality of slots of a stator core of the stator, such that axial end sections of the at least two conductors are electrically connectable, and such that respective axial end sections of the radially adjacent at least two conductors are distanced from each other, characterized by:
the respective axial end sections being axially distanced from each other, and an axial distance between a proximal end of the respective axial end section of a first conductor of the at least two conductors and an axial surface of the stator core is longer than a distance between a distal end of the respective axial end section of a second conductor of the at least two conductors and the axial surface of the stator core; and
the plurality of slots providing respective compartments that are formed by respective distancing members such that the at least two conductors are radially distanced from each other by the respective distancing members in respective slots.

20. The method as claimed in claim 19, wherein the stator comprises:
the stator core which has the plurality of slots arranged in a circumferential direction of the stator core; and
the at least two conductors arranged next to each other along a radial direction of the slot, wherein:
axial end sections of the at least two conductors are free from a separate insulting member,
the axial end sections are axially delimited by a proximal end directed towards the stator core and by a distal end directed away from the stator core, and
the axial end sections of the at least two radially adjacent conductors are distanced from each other, characterized by:
the axial end sections being axially distanced from each other, wherein an axial distance between a proximal end of the axial end section of a first conductor of the at least two conductors and an axial surface of the stator core is longer than a distance between a distal end of the axial end section of a second conductor of the at least two conductors and the axial surface of the stator core, and
the plurality of slots providing respective compartments that are formed by respective distancing members, such that the at least two conductors are radially distanced from each other by the respective distancing members in respective slots.

21. The method as claimed in claim 19, wherein the at least two conductors are radially distanced from each other by a distancing member in the slot by a distance of at least 1-2 mm.

22. The method as claimed in claim 19, comprising inserting insulating members into the slots of the stator core, such that a first pre-shaped insulating member axially protrudes by a distance from the stator core which is larger than a distance by which a second pre-shaped insulating member protrudes from the stator core, the second pre-shaped insulating member being radially adjacent to the first pre-shaped insulating member in a same slot of the plurality of slots.

* * * * *